United States Patent [19]

Benzing

[11] 4,369,506
[45] Jan. 18, 1983

[54] METHOD AND APPARATUS FOR SHEAR WAVE LOGGING

[75] Inventor: William M. Benzing, Ponca City, Okla.

[73] Assignee: Conoco, Inc., Ponca City, Okla.

[21] Appl. No.: 168,055

[22] Filed: Jul. 14, 1980

[51] Int. Cl.³ .............................................. G01V 1/40
[52] U.S. Cl. ...................................... 367/31; 367/48; 367/75; 367/911; 181/108
[58] Field of Search ................. 367/25, 31, 48, 75, 367/911; 181/102, 108, 112; 166/250; 175/50

[56] References Cited

U.S. PATENT DOCUMENTS

| | | | |
|---|---|---|---|
| 2,191,119 | 2/1940 | Schlumberger | 367/48 |
| 2,241,874 | 5/1941 | Zuschlag | 367/48 |
| 2,265,768 | 12/1941 | Athy et al. | 367/25 |
| 2,784,796 | 3/1957 | Overton | 367/48 |
| 2,943,694 | 7/1960 | Goodman | 367/48 |
| 3,330,375 | 7/1967 | White | 367/25 |
| 4,143,736 | 3/1979 | Fair | 367/75 |

FOREIGN PATENT DOCUMENTS

| | | | |
|---|---|---|---|
| 702331 | 4/1977 | U.S.S.R. | 367/75 |
| 69306 | 11/1979 | U.S.S.R. | 367/48 |

OTHER PUBLICATIONS

Koarsberg, "Elastic Wave Velocity ... by Phase-Delay Methods", 12/75, pp. 955-960, Geophysics, vol. 40, #6.

Primary Examiner—Nelson Moskowitz
Attorney, Agent, or Firm—William J. Miller

[57] ABSTRACT

Apparatus for shear wave logging of a fluid-filled borehole which consist of an elongated housing defining an air cavity and containing first and second spaced geophone housing each having an orthogonal pair of horizontal motion detectors secured therein for detection of horizontal shear waves along said borehole as generated from a seismic source in a frequency range having wavelengths that are long relative to the length of housing.

6 Claims, 4 Drawing Figures

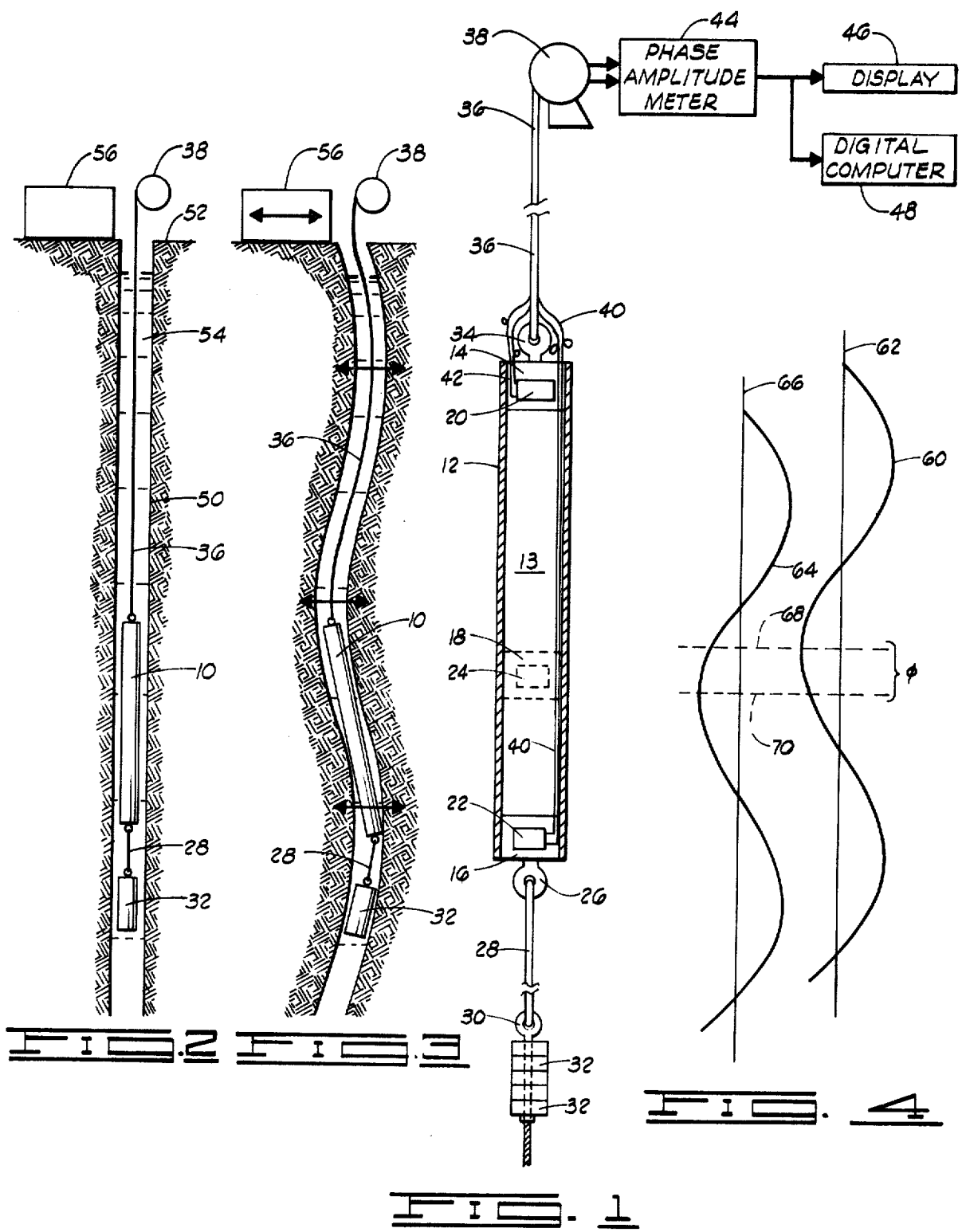

METHOD AND APPARATUS FOR SHEAR WAVE LOGGING

BACKGROUND OF THE INVENTION

1. Field of the Invention

The invention relates generally to shear wave acoustic logging of bore holes and, more particularly, but not by way of limitation, it relates to an improved method and apparatus for obtaining shear wave data related to longer wavelength source frequencies.

2. Description of the Prior Art

The prior art includes numerous types of shear wave logging tool as they have been used for a number of years in obtaining shear wave data from a bore hole in the earths surface. Shear wave generation sources have been utilized both from a position on the earth's surface adjacent the bore hole as well as from the logging tool itself, i.e. the source is an integral part of the tool. In most prior art shear wave applications the generation source has been controlled within higher frequency ranges, e.g. 10–15 kilohertz, and both shear wave source and detectors were positioned in close coupling contact with the bore hole wall in order to provide optimum detection of the shear wave energy. The prior art applications tended toward higher frequency source energies which tended to see the well bore from a microscopic point of view in that a relatively small portion of the well adjacent to the logging tool is seen to vibrate under the influence of those shear wave vibrations whose wavelength is smaller than the bore diameter. Due to this then, depth of penetration or examination by the acoustic waves is limited to the rock structures closely surrounding the bore hole.

SUMMARY OF THE INVENTION

The present invention relates to an improved method and apparatus for obtaining subsurface shear wave velocities. The present invention utilizes longer wavelengths at lower frequencies and, therefore, gives a better representation of the rock properties at a greater distance away from the potentially disturbed well bore. Thus, the tool of the present invention sees the well bore from a macroscopic point of view in that the entire well bore is visualized as oscillating under the influence of transverse horizontal shear wave vibrations whose wavelength is large compared to the well bore diameter. The invention utilizes a sensor or tubular tool that is designed to move sympathetically with the vibrating bore hole to thus give a true representation of the downward traveling shear wave that causes the bore hole to oscillate. The tool includes two or more geophones spaced a distance apart, and the tool is filled with air to provide for weight adjustability relative to the bore hole fluid. Horizontal shear waves are then generated at the surface in the 10–300 hertz range such that the mono-frequency shear wave disturbance traveling past the sensors may be detected and phase compared to obtain an indication that relates to the velocity of shear waves in the earth adjacent the bore hole.

Therefore, it is an object of the present invention to provide a method of obtaining more reliable shear wave velocity data relative to a fluid-filled bore hole and the surrounding strata.

It is also an object of the present invention to provide an improved type of shear wave detection tool which is sympathetic to the contortional movements of the bore hole when under shear wave stresses.

It is yet another object of this invention to provide a bore hole shear wave detector which provides greater indication of shear wave velocity through a greater volume of the surrounding earth structure.

Finally, it is an object of the present invention to generate and detect lower frequency horizontal shear waves which bear more accurate relationship to the lock properties of the surrounding strata.

Other objects and advantages of the invention will be evident from the following detailed description when read in conjunction with the accompanying drawings which illustrate the invention.

BRIEF DESCRIPTION OF THE DRAWINGS

FIG. 1 is a partial block and schematic illustration of the logging tool and surface processing equipment of the present invention;

FIG. 2 is a view in idealized form of a shear wave logging tool suspended in a bore hole formed in the earth's surface;

FIG. 3 is an idealized view of the shear wave logging tool and bore hole when under stress due to generation of horizontal shear waves at the surface; and FIG. 4 illustrates the phase relationship of detected horizontal shear waves.

DETAILED DESCRIPTION OF THE INVENTION

FIG. 1 illustrates a logging tool 10 as it would be suspended in operative association with a bore hole structure. The tool 10 consists primarily of a selected size of metal tubing 12 defining an internal cavity 13 and having the upper and lower ends sealingly closed by geophone housings 14 and 16, respectively. Optionally, additional spaced horizontal geophone housings, such as housing 18, may be utilized to provide additional shear wave data output.

The geophone housings such as 14, 16 are a standard form of sealed structure for containing conventional types of horizontally polarized geophone 20 and 22 in proper attitude and support for detecting horizontal wave motion. Any additional geophones 24 will be similarly mounted at selected spacing and provided with necessary electrical connection to the surface processing equipment. The lower most geophone housing 16 includes an eye bolt suitably affixed therebeneath, as by welding, in adaptation to receive a cable 28 which, in turn, is connected to an anchor bolt 30 for receiving a selected plurality of weights 32.

Upper geophone housing 14 is similarly secured to an eye bolt 34 which serves for affixure of suspension cable 36 extending down the bore hole from a suitable surface winch 38. Detected output from geophone 22 may be conducted via leads 40 and up through suspension cable 36 as is common practice using standard logging cable. In like manner, geophone 20 is provided with surface-connecting leads 42 and similar leads would be provided for additional geophones, such as an optionally employed geophone 24.

Electrical outputs from the geophones are then taken off of logging cable 36 for input to a phase amplitude meter 44 which provides further output to a display 46 and/or suitable digital computer or microprocessor circuitry 48. There are various forms of suitable phase amplitude meter 44 which are commercially available; however, present application utilizes a phase amplitude meter as manufactured by Hewlett-Packard Corporation of Palo Alto, California. Output display 46 may take any of the various forms utilized in geophysical field work such as photographic, chart recorder and other equivalents.

Referring now to FIG. 2, there is illustrated a bore hole 50 as formed in earth surface 52 and filled with fluid 54, i.e. water, mud or the like. The shear wave tool 10 is then suspended from a suitable winch 38 by logging cable 36 and positioned downhole adjacent selected strata. A horizontal shear wave source 56 may then be coupled on the earth's surface 52 proximate to or within the bore hole 50. Referring also to FIG. 3, an exaggerated illustration, the shear wave source 56 is energized at a selected frequency within the range of 10–300 hertz, frequencies having wavelengths much longer than the characteristic dimensions of the bore hole 50, and the tendency is to cause a contortion of the bore hole as indicated. The horizontal shear wave source 56 may be any suitable form of controlled frequency source such as a vibrator or the like which provides reliable frequency of energy input to the earth surrounding the bore hole.

FIG. 4 illustrates the manner in which horizontal geophones 20 and 22 located at spacing d generate phase-displaced signal outputs for comparison by phase amplitude meter 44. Thus, geophone 20 detects horizontal shear wave signal 60 as shown on base line 62, and the lower or more remote geophone 22 detects a shear wave signal 64 as shown on base line 66 in phase displaced relationship. Thus, the phase delay $\phi$, as illustrated by dash lines 68, 70, provides a quantity which can be directly related to shear wave velocity in the surrounding medium when the frequency of propagation is known. Should additional geophones 24 or the like be employed, similar phase differentials can be derived by phase amplitude meter 44 for comparison to other data and further verification of the shear wave velocity in the surrounding medium.

In operation, the cavity 13 is maintained air-filled in order to achieve a selected buoyancy characteristic which will allow the non-coupled tool 10 to be suspended for movements sympathetic to the vibrational contortions of bore hole 50, thereby to achieve maximum detector output and more clear signal phase definition. The buoyancy caused by air-filled cavity 13 is then offset to achieve a near neutral buoyancy in the bore hole fluid by addition of a selected number of weights 32 on anchor bolt 30. The number and size of weights will depend upon the density of the bore hole fluid and the conditions of the bore hole fluid and the bore hole wall. The weight 32 and tool assembly 10 is then lowered into the bore hole as suspended by cable 36 to a designated depth and the horizontal shear wave source 56 is operated to provide shear wave input to the earth and propagation through the medium surrounding the bore hole. The motion of the vibrating bore hole is than sensed by two or more horizontal geophones 20, 22 as spaced apart by a distance d with output of the sensed voltage indication transmitted up to phase amplitude meter 44 at the surface station. For any continuous, monofrequency shear wave disturbance traveling past the sensor, the output frequency of the geophones will be identical except that a phase difference $\phi$ will be seen between the two geophone outputs, as shown in FIG. 4. This phase difference is given by the well-known expression:

$$\phi = (2\pi/\lambda)\cdot d$$

where $\phi$ is the phase angle difference between the geophone outputs of geophone 20 and 22, $\lambda$ is the wavelength of the downward traveling shear wave, and d is the spacing between the geophones. Thus, by measuring the difference in phase and knowing the spacing d, the wavelength of the shear wave can be readily determined. Thereafter, frequency f being known, the actual shear wave velocity V is determinable by simple conversion using:

$$V = f\lambda.$$

The logging tool may be intermittently lowered to successively deeper strata along the bore hole 50, each time energizing the shear wave source 56 and analyzing the detected shear wave data through phase amplitude meter 44 to detect phase difference. The digital phase difference output may then be applied to display 46 as well as computer 48, e.g. a simple microprocessor, to effect shear velocity conversion and subsequent recording, e.g. as shear wave velocity log.

The foregoing disclosed a novel form of shear wave detection tool which exhibits a selected degree of buoyancy in the bore hole fluid and which does not require hydraulic or electric packer equipment and actuatable extensors for coupling the detection apparatus to the borehole wall. Thus, the detection tool is allowed to move sympathetically with the bore hole wall while detecting lower frequency shear waves from the wall/fluid interface thereby to give a true representation of the downward traveling shear wave that causes the bore hole to oscillate.

It should be understood that changes may be made in the arrangement of elements as heretofore set forth in the specification and shown in the drawings; it being understood that changes may be made in the embodiments disclosed without departing from the spirit and scope of the invention.

The embodiments of the invention in which an exclusive property or privilege is claimed are defined as follows:

1. Apparatus for shear wave logging within a fluid-filled borehole comprising:
    a shear wave vibration source earth coupled adjacent said borehole to propagate shear wave energy of selected frequency having wave length that is long compared to detector spacing, said energy being propagated vertically along said borehole;
    an elongated housing having upper and lower ends and defining an internal air cavity portion;
    first and second geophone housings sealingly connected in said elongated housing at opposite ends of said air cavity portion;
    first and second horizontal motion detectors secured within said respective geophone housings and spaced by a selected distance;
    means for suspending said elongated housing at a selected point along said borehole; and
    means conducting electrical output from said first and second detectors and analyzing to determine and output horizontal shear wave phase difference.

2. Apparatus as set forth in claim 1 which is further characterized to include:
    adjustable weighting means supported form the lower end of said elongated housing.

3. Apparatus as set forth in claim 2 wherein:

said weighting means is resiliently supported from said elongated housing.

4. Apparatus as set forth in claim 1 which is further characterized to include:
   at least one additional horizontal motion detector secured within said elongated housing.

5. Apparatus as set forth in claim 4 which further includes:
adjustable weighting means supported from the lower end of said elongated housing.

6. Apparatus as set forth in claim 1 which further includes:
   microprocessor means receiving shear wave phase difference output to provide horizontal shear wave velocity output.

* * * * *